Nov. 27, 1934.　　　G. N. GOODRICH　　　1,982,095

SEPARATOR FOR STORAGE BATTERIES

Filed Aug. 12, 1931

Inventor

George N. Goodrich

By Stryker & Stryker

Attorneys

Patented Nov. 27, 1934

1,982,095

UNITED STATES PATENT OFFICE 1,982,095

SEPARATOR FOR STORAGE BATTERIES

George N. Goodrich, St. Paul, Minn.

Application August 12, 1931, Serial No. 556,509

5 Claims. (Cl. 136—143)

Heretofore foraminous sheets of hard rubber have been employed as separators which confine the active material on the positive plates of storage batteries, but such hard rubber separators have not been entirely satisfactory under certain operating conditions wherein generated gas bubbles adhere to the openings in the separators to such an extent that they obstruct the necessary passage of the positive and negative ions to and from the active material on the plates.

It is an object of this invention to provide separators having a novel arrangement of openings whereby the obstruction afforded by the separators is substantially reduced.

More particularly, it is my object to provide a separator having groups of perforations of two or more different sizes and shapes, at least some of the perforations of one shape or size being interconnected with those of a different shape or size in such a way that irregular edges are formed on the perforations. It is my belief that these sharp, irregular edges either reduce the adherence of the gas bubbles to the separator or break up such bubbles as would otherwise lodge in the openings and obstruct the path formed by the electrolyte for the ionization of the plates or passage of the electric charge.

Figure 1:
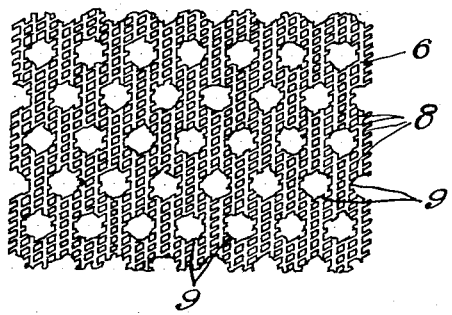
Figure 2:
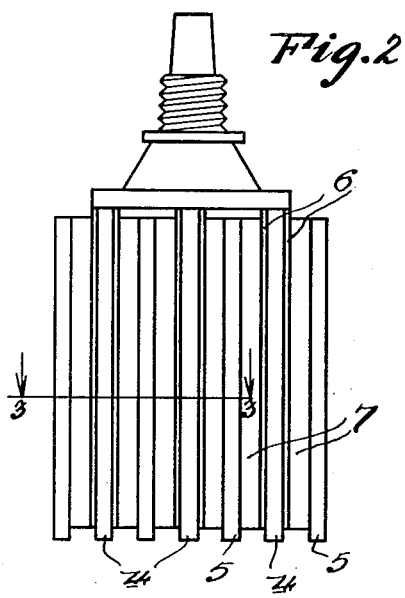
Figure 3:
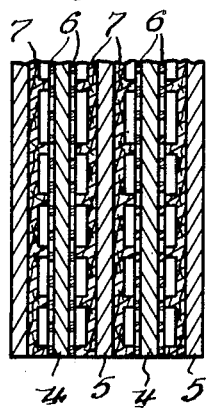

The invention will be best understood by reference to the accompanying drawing in which, Figure 1 is a plan view showing a fragment of my improved separator on an enlarged scale;

Fig. 2 is a diagrammatic view showing the location of the separator sheets in a battery; and Fig. 3 is a section taken on the line 3—3 of Fig. 2.

As shown in Figs. 2 and 3, the positive plates of a battery are indicated by the numeral 4 and the negative plates by the numeral 5. My improved separator sheets 6 are located adjacent to the plates 4, so as to cover both sides of the same and the usual wooden separators 7 are placed between the sheets 6 and the negative plates 5. The sheets 6 are preferably constructed from hard rubber of the usual, thin, flexible nature and are formed with a multiplicity of openings 8 of one size and shape and another group of openings 9 of another shape and larger size. Each of the openings 9 intersects and is connected with a number of the openings 8 so that the edge of the sheet at each opening 9 is irregular, having numerous small projections of pointed or sharp form. In the embodiment illustrated, the dies for punching the openings 8 have projections of diamond shape in cross section while the dies for forming the openings 9 are circular in cross section, the latter openings being formed as a separate operation, following the punching of the openings 8. It will be understood, however, that the sheets may be punched in one operation by suitable dies having projections of the desired irregular shape or non-uniform size or adapted to produce the small reentrant projections at the margins of the openings. In Fig. 1 the openings 8 and 9 are shown about twice their actual size.

My improved separators have high porosity and ample strength and it has been found in practice that the irregular shaped openings of different sizes produce increased efficiency. The forms of these openings or perforations may be varied without departing from the spirit of my invention.

Having described my invention, what I claim as new and desire to protect by Letters Patent is:

1. A separator of the class described comprising a sheet of hard rubber formed with at least two groups of perforations, the perforations of one group being of a shape and size different from those of the other group and certain of the perforations of one group being interconnected with perforations of the other group to form pointed projections and irregular edges on the sheet adjacent the perforations.

2. A separator for storage batteries comprising, a sheet of material having a multiplicity of relatively small perforations therein and having a set of relatively large perforations therein, the large perforations intersecting with some of the relatively small perforations, and the material between the intersecting small apertures forming irregular-shaped edge portions of the relatively large apertures.

3. A separator for storage batteries comprising, a sheet of material having a multiplicity of relatively small, definitely-located perforations and having a set of relatively large, definitely-located perforations therein which intersect with some of the relatively small perforations, the portions of the material of the sheet between adjacent intersected small apertures forming irregularly-shaped edge portions of the relatively large apertures.

4. A separator for storage batteries comprising a sheet of material having a multiplicity of relatively small, definitely-shaped perforations therein, and having a set of relatively large perforations therein each of which intersects with some of the relatively small perforations and the material between adjacent intersected small apertures forming irregularly-shaped edge portions of the relatively large apertures.

5. A separator for storage batteries comprising a sheet of material having a multiplicity of relatively small apertures formed therein by the removal of material from the sheet and having a set of relatively large apertures formed therein by the removal of material from the sheet, the large apertures intersecting with some of the small apertures whereby some of the sheet material defining the small apertures is removed from the sheet and the remaining portions of material defining the small apertures form irregularly-shaped edge portions of the relatively large apertures.

GEORGE N. GOODRICH.